United States Patent
Sano et al.

(10) Patent No.: US 8,719,496 B2
(45) Date of Patent: May 6, 2014

(54) STORAGE APPARATUS AND METHOD FOR EXECUTING EXCLUSIVE EXTENT PROCESSING IN PARALLEL USING COUNTER VALUES

(75) Inventors: Takumi Sano, Odawara (JP); Isamu Kurokawa, Odawara (JP); Akihiro Mori, Odawara (JP); Ran Ogata, Odawara (JP); Yuya Goto, Odawara (JP)

(73) Assignee: Hitachi, Ltd., Tokyo (JP)

( * ) Notice: Subject to any disclaimer, the term of this patent is extended or adjusted under 35 U.S.C. 154(b) by 782 days.

(21) Appl. No.: 12/922,574

(22) PCT Filed: Sep. 2, 2010

(86) PCT No.: PCT/JP2010/005403
§ 371 (c)(1),
(2), (4) Date: Sep. 14, 2010

(87) PCT Pub. No.: WO2012/029092
PCT Pub. Date: Mar. 8, 2012

(65) Prior Publication Data
US 2012/0059988 A1    Mar. 8, 2012

(51) Int. Cl.
*G06F 12/00*    (2006.01)
*G06F 3/06*    (2006.01)
*G06F 13/14*    (2006.01)

(52) U.S. Cl.
USPC ............... 711/114; 711/150; 710/36

(58) Field of Classification Search
None
See application file for complete search history.

(56) References Cited

U.S. PATENT DOCUMENTS

| 6,567,865 | B1 | 5/2003 | Araki et al. | |
|---|---|---|---|---|
| 6,665,739 | B2 * | 12/2003 | Vishlitzky et al. | 710/5 |
| 6,754,727 | B2 * | 6/2004 | Kurokawa et al. | 710/9 |
| 2003/0204691 | A1 | 10/2003 | Chang et al. | |
| 2005/0050274 | A1 | 3/2005 | Araki et al. | |
| 2008/0263190 | A1 * | 10/2008 | Serizawa et al. | 709/223 |

FOREIGN PATENT DOCUMENTS

| EP | 1 986 090 A2 | 10/2008 |
|---|---|---|
| JP | 2000-181773 A | 6/2000 |
| WO | WO 2010100768 A1 * | 9/2010 |

* cited by examiner

*Primary Examiner* — Tuan Thai
*Assistant Examiner* — Glenn Gossage
(74) *Attorney, Agent, or Firm* — Volpe and Koenig, P.C.

(57) ABSTRACT

A storage apparatus includes a microprocessor package configured to access a logical volume and a local memory in the microprocessor package. An input/output (I/O) request range of one I/O request, including a start position address and an end position address of the logical volume which is a target of the one I/O request, is stored in the local memory. A counter value indicating a number of I/O requests to and from the logical volume associated with the one I/O request is acquired and stored in the local memory. If the counter value associated with the one I/O request is greater than the counter value associated with another I/O request, the I/O request ranges of the one I/O request and the other I/O request are compared. If there is no overlap between the I/O request ranges, the one I/O request is executed; otherwise, the one I/O request is placed on standby.

9 Claims, 18 Drawing Sheets

DISK 1  DISK 2  DISK n

| LDEV No | No. OF MPPK WITH OWNERSHIP RIGHTS |
|---|---|
| 0 | 0 |
| 1 | 1 |
| 2 | 0 |
| ⋮ | ⋮ |

| No | ITEM | REMARKS |
|----|------|---------|
| 1 | EXTENT PROCESSING CONTROLLER | EXTENT RESERVATION BIT 0x80000000<br>EXCLUSIVE EXTENT WAITING BIT 0x40000000<br>EXTENT SIGNIFICANT BIT 0x20000000<br>COUNTER VALUE SIGNIFICANT BIT 0X10000000 |
| 2 | COUNTER VALUE | |
| 3 | START POSITION ADDRESS | |
| 4 | END POSITION ADDRESS | |

| MP No | JCB No | GENERATION No |
|---|---|---|
| 0 | 9 | 0 |
| 0 | 3 | 1 |
| 0 | 5 | 1 |
| 1 | 0 | 0 |
| ⋮ | ⋮ | ⋮ |
| 1901 | 1902 | 1903 |

1900

STORAGE APPARATUS AND METHOD FOR EXECUTING EXCLUSIVE EXTENT PROCESSING IN PARALLEL USING COUNTER VALUES

TECHNICAL FIELD

The present invention relates to a storage apparatus and data access method, and is suitably applied to a storage apparatus and data access method which executes extent overlap determination processing for a plurality of input/output (I/O) requests in parallel.

BACKGROUND ART

A storage apparatus that is connected to host computers via a network comprises a plurality of magnetic disks, for example, as storage devices for storing data. The storage apparatus utilizes RAID (Redundant Array of Independent Disks) technology to establish redundancy of the storage areas of the plurality of storage devices and construct a RAID group. In addition, the storage apparatus provides the host computers with storage areas in the capacity required by the host computers and as logical volumes, from part of the RAID group.

Furthermore, if there is a data I/O request from the host computers, the storage apparatus executes exclusive extent processing, prior to executing the data I/O processing, so that there is no concurrent access to identical areas and to preserve the consistency of the access sequence. More specifically, exclusive extent processing is designed to prevent competing access to identical areas by determining whether or not there are I/O requests with overlapping extents (I/O request ranges) in the same logical volume among a plurality of I/O requests, and then if an overlap exists, awaiting I/O processing corresponding to the I/O requests, and if no overlap exists, continuing I/O processing corresponding to the I/O requests.

For example, PTL1 discloses an arrangement whereby, if an I/O request is sent to the storage apparatus, a control table of a logical volume targeted by the I/O request is locked and exclusive extent processing is executed.

CITATION LIST

Patent Literature

[PTL 1] Japanese Laid-Open Patent Publication No. 2000-181773.

SUMMARY OF INVENTION

Technical Problem

However, in PTL1, if exclusive extent processing of an I/O request is being executed with respect to one logical volume, then exclusive extent processing of other I/O requests with respect to the logical volume enters a waiting state. As a result, due to an increase in the multiplicity of I/O requests with respect to the same volume, there is an increase in the I/O requests awaiting exclusive extent processing and therefore a deterioration in response time performance.

The present invention was conceived in view of the aforementioned points and proposes a storage apparatus and data access method with which exclusive extent processing of a plurality of I/O requests is executed in parallel in order to improve the response time performance.

Solution to Problem

In order to achieve this object, the present invention provides a storage apparatus which is connected via a network to a host apparatus which requests data I/Os, comprising a plurality of microprocessors which control data I/O to and from a plurality of storage devices on the basis of the data I/O requests from the host apparatus; a first memory which stores, for each storage area of a predetermined range provided by the plurality of storage devices, counter values indicating the order of the I/Os to and from the storage areas; and a second memory which stores control information of the I/O requests for each of the I/O requests, wherein the microprocessors store, if there is one I/O request from the host apparatus, an I/O request range of the one I/O request in an area for storing control information of the one I/O request of the second memory, acquire, from the first memory, the counter value of the storage area which is the target of the one I/O request and store the counter value in the area for storing control information of the one I/O request of the second memory, and compare, if the counter value of the one I/O request is greater than the counter value of another I/O request, the I/O request range of the one I/O request stored in the second memory with the I/O request range of the other I/O request.

With this configuration, when executing I/O processing, the microprocessor is able to provide a counter value to each of the logical volumes which are targets of the I/O processing and determine the access sequence for access to the logical volumes on the basis of these counter values. By providing the counter values, the counter values may be acquired and access by other I/O processing may be restricted only while the counter values are being incremented. It is therefore possible to execute in parallel exclusive extent processing of a plurality of I/O requests with respect to the same logical volume, thereby improving the response time performance.

Advantageous Effects of Invention

According to the present invention, the response time performance can be improved by executing, in parallel, exclusive extent processing of a plurality of I/O requests.

BRIEF DESCRIPTION OF DRAWINGS

FIG. 14 A table showing the details of extent management information which is stored in the job control blocks, according to the first embodiment.

FIG. 20 A chart showing an example of a search list according to the first embodiment.

DESCRIPTION OF EMBODIMENTS

An embodiment of the present invention will be described in detail hereinbelow with reference to the drawings.

(1) Hardware Configuration of the Computer System

Figure 1:
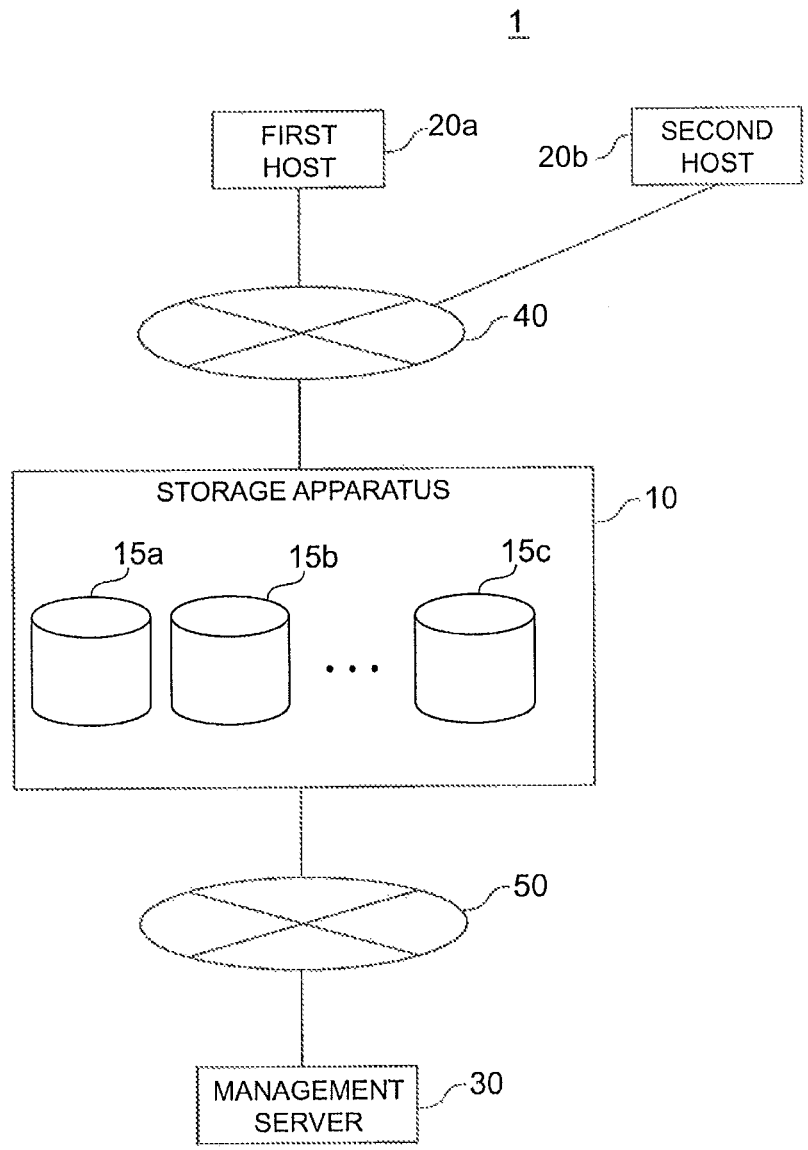
FIG. 1 A block diagram showing the whole configuration of a computer system according to a first embodiment of the present invention.

As shown in FIG. 1, the computer system 1 according to this embodiment comprises a storage apparatus 10 and first and second hosts 20a, 20b (hereinafter the first and second hosts are referred to simply as the 'hosts 20'), a management server 30, and networks 40 and 50.

The hosts 20 are computer apparatuses comprising information processing resources such as a CPU (Central Processing Unit) and a memory, and are configured from a personal computer, workstation, mainframe or similar, for example. The CPU functions as an arithmetic processing unit and controls the operation of the hosts 20 in accordance with programs and computational parameters and the like which are stored in the memory. Furthermore, the hosts 20 comprise information input devices such as a keyboard, switch, pointing device, and/or microphone, and an information output device such as a display monitor and/or speaker.

Furthermore, the hosts 20 are connected to the storage apparatus 10 via the network 40. The network 40 is configured from a SAN (Storage Area Network) or the like, for example, and inter-device communications are executed in accordance with the Fibre Channel Protocol, for example. Furthermore, the network 40 may also be a LAN (Local Area Network), the Internet, a public line or a dedicated line or similar, for example. If the network 40 is a LAN, inter-device communications are executed in accordance with the TCP/IP (Transmission Control Protocol/Internet Protocol) protocol, for example.

The storage apparatus 10 is configured from information processing resources such as a CPU and a memory and a plurality of storage media 15a, 15b, and 15c (may also be referred to hereinbelow simply as 'storage media 15'). Moreover, the storage apparatus 10 parses commands transmitted from the hosts 20 and executes data I/Os with respect to storage areas of the storage media 15.

The storage media 15 are configured, for example, from a plurality of hard disk drives (HDD: Hard Disk Drives) which are high-cost hard disk drives such as SSD (Solid State Disk), SCSI (Small Computer System Interface) disks or low-cost hard disk drives such as SATA (Serial Advanced Technology Attachment) disks. The storage media 15 may also be referred to hereinbelow as 'hard disks 15'.

The management server 30 is a computer apparatus comprising information processing resources such as a CPU and a memory, and is configured from a personal computer, workstation, or mainframe or similar, for example. The CPU functions as an arithmetic processing unit and controls the operation of the management server 30 in accordance with programs and computational parameters and the like which are stored in the memory. Furthermore, the management server 30 comprises information input devices such as a keyboard, switch, pointing device, and/or microphone, or the like, and an information output device such as a monitor display and/or speaker, and manages the storage apparatus 10 in response to inputs from an operator or the like.

Furthermore, the management server 30 is connected to the storage apparatus 10 via the network 50. The network 50 is configured from a SAN or LAN or the like, for example, similarly to the network 40.

In addition, the program stored in the memory of the management server 30 is a program for managing the storage media 15 of the storage apparatus 10, and manages, for example, the configuration of the RAID group and the capacities of the logical volumes configured from part of the RAID group. The management server 30 changes the RAID configuration information and so forth by transmitting commands corresponding to user operations to the storage apparatus 10.

(2) Storage Apparatus Hardware Configuration

Figure 2:
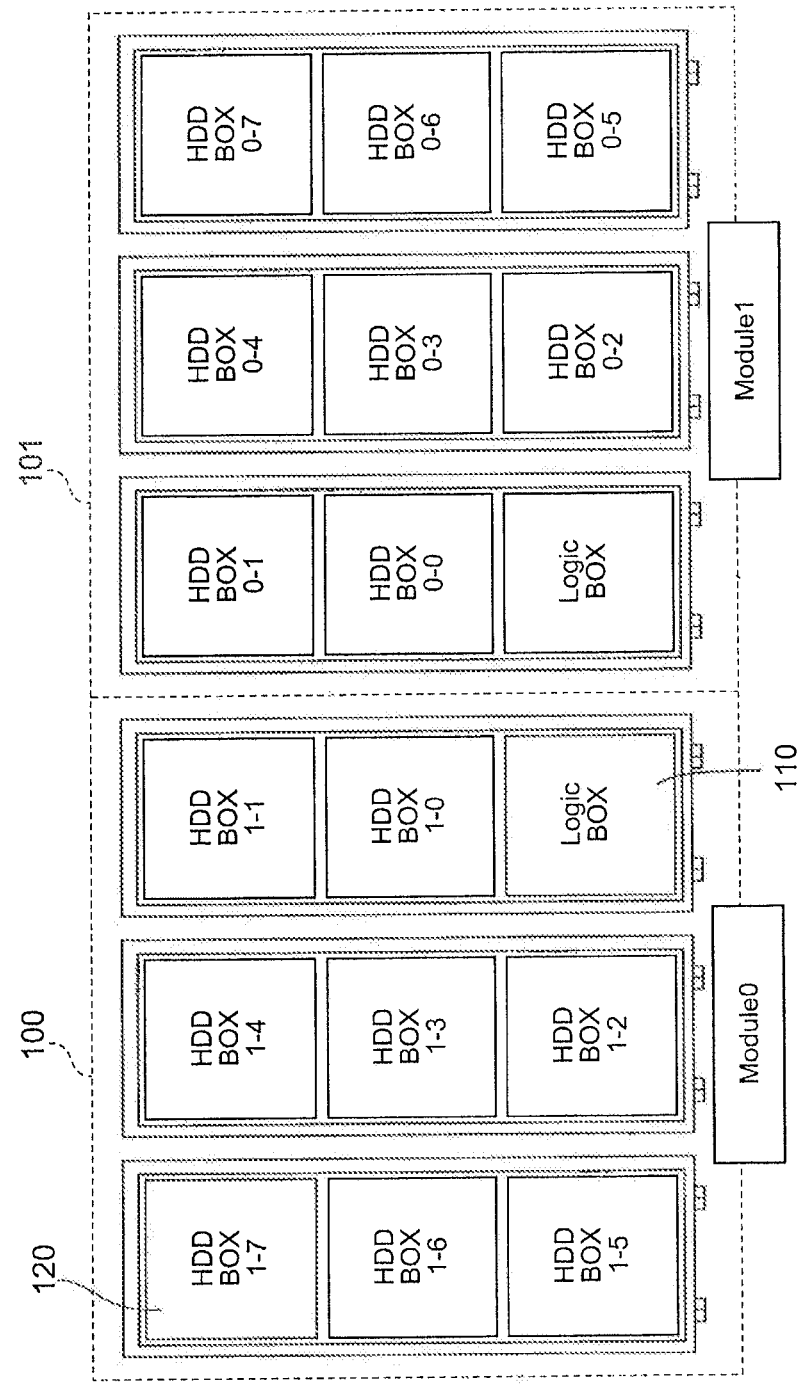
FIG. 2 A conceptual diagram showing an external configuration of a storage apparatus according to the first embodiment.

FIG. 2 shows the external configuration of the storage apparatus 10. The storage apparatus 10 is configured from a module 100 (abbreviated as 'Module 0' in the drawings) and a module 101 (abbreviated as 'Module 1' in the drawings). Modules 100 and 101 have the same configuration and hence a detailed description of the configuration of module 101 will not be provided here.

Module 100 comprises a control module 110 for controlling the overall operation of the storage apparatus 10 and a driving module 120 in which a plurality of disk drives are stored. As shown in FIG. 2, module 100 comprises three enclosures and a single enclosure is configured from three rack boxes. Among the nine rack boxes, the control module 110 is stored in one rack box (abbreviated as 'Logic BOX' in FIG. 2) and a driving module 120 is stored in the eight other rack boxes (abbreviated as 'HDD BOX' in FIG. 2).

The rack box from which the control module 110 is configured is loaded with a plurality of logical substrates for controlling data I/Os between the hosts 20 and driver modules 120. Logical substrates which are loaded into the rack box for the control module 110 include, for example, a CPU (Central Processing Unit) for controlling data I/Os, channel adapters for communicating with the hosts 20, and disk adapters for exercising control of data I/Os with respect to the disk drives stored in the driver modules 120.

Figure 3:
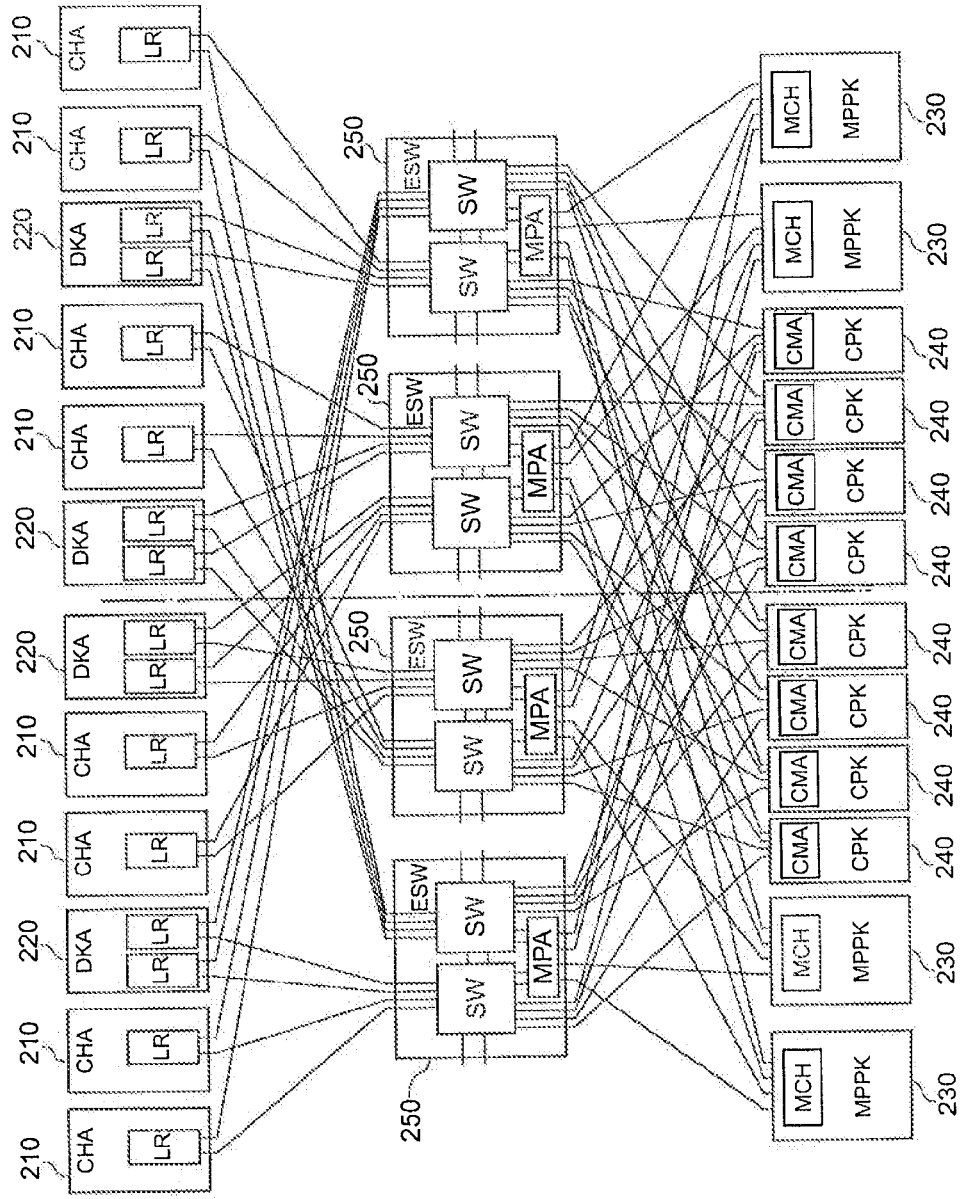
FIG. 3 A block diagram showing a specific linear configuration of each logical substrate of a control module of the storage apparatus according to the first embodiment.

FIG. 3 shows a specific linear configuration of each logical substrate in the control module 110 of the storage apparatus 10. As shown in FIG. 3, the control module 110 is configured from a plurality of channel adapters (abbreviated as 'CHA' in the drawings) 210, a plurality of disk adapters (abbreviated as 'DKA' in the drawings) 220, a plurality of path switches 250 (abbreviated as 'ESW' in the drawings), a plurality of microprocessor packages (abbreviated as 'MPPK' in the drawings) 230, and a plurality of cache packages (abbreviated as 'CPK' in the drawings) 240.

The channel adapters 210 are channel interface boards. The channel adapters 210 have a function for the data transfer of commands received from the hosts via local routers (abbreviated as 'LR' in FIG. 3). The disk adapters 220 are hard disk interface boards. The channel adapters 210 have a function for the data transfer of commands sent to the hard disks via local routers.

The microprocessor packages 230 function as four-microprocessor CPUs. The microprocessor packages 230 include a memory and a processor which are connected via a memory controller hub (abbreviated as 'MCH' in the drawings) 232. The cache packages (abbreviated as 'CPK' in the drawings) 240 include a function for temporarily storing data. The cache packages 240 perform data transfers via cache memory adapters (abbreviated as 'CMA' in the drawings).

The path switches 250 interconnect the microprocessor packages 230, the channel adapters 210, the disk adapters 220, and the cache packages 240 and include a function for distributing data by means of switches (abbreviated as 'SW' in the drawings) and include a microprocessor adapter (abbreviated as 'MPA' in the drawings).

Data transfer in the control module 110 will now be described. First, data is transmitted from the hosts 20 via the channel adapters 210 and the data transmitted to the channel adapters 210 is stored. Notification that data has been transmitted from the hosts 20 is then sent to the microprocessor packages 230. Any of the microprocessors in the microprocessor packages 230 can then acquire the data stored in the channel adapters 210. In addition, the microprocessors execute data reads/writes and so on based on instructions from the hosts 20 and store the execution results in the cache packages 240. The microprocessor then informs the channel adapters 210 that data read/write processing or the like has been executed. Furthermore, the channel adapters 210 then transmit the processing results stored in the cache packages 240 to the hosts 20.

It is assumed in the foregoing that the data transmitted from the hosts 20 is stored in the channel adapters 210 but storage is not limited to this example. For example, the data transmitted from the hosts 20 may also be stored in shared memory (not shown) separate from the channel adapter 210. In this case, the microprocessors of the microprocessor packages 230 acquire the data stored in the shared memory and execute data reads/writes and so on based on instructions from the hosts 20.

Figure 4:
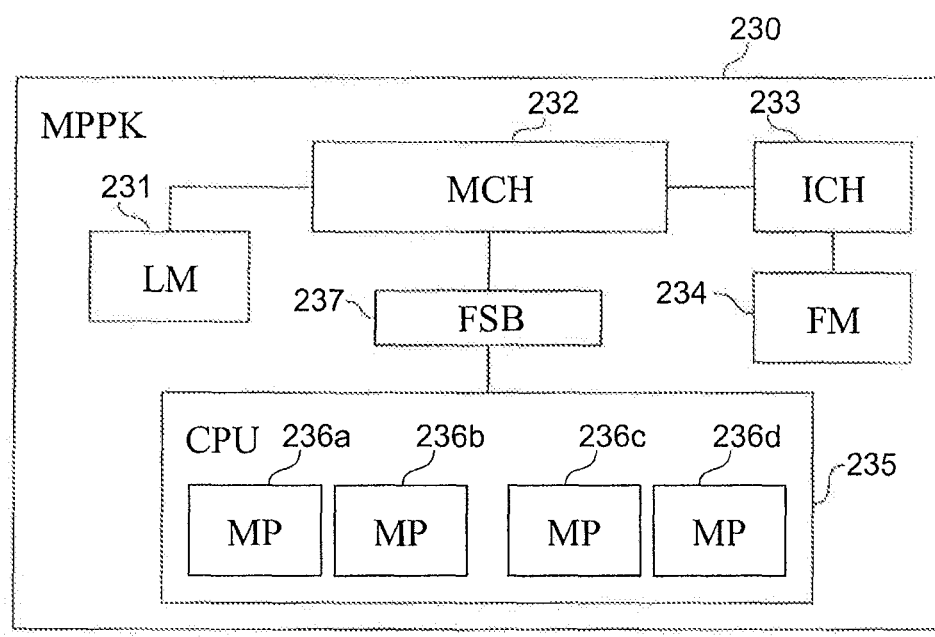
FIG. 4 A block diagram showing an internal configuration of a microprocessor package according to the first embodiment.

FIG. 4 shows an internal configuration of the microprocessor package 230. The microprocessor package (abbreviated as 'MPPK' in the drawings) 230 comprises a Logical Memory (LM) 231, a Memory Controller Hub (MCH) 232, a I/O Controller Hub (ICH) 233, a Flash Memory (FM) 234, a CPU 235, and a Front Side Bus (FSB) 237.

The logical memory 231 is a local memory in the microprocessor package 230 and temporarily stores programs used by the CPU 235 and parameters and so on which suitably vary in its execution. The local memory 231 is mutually connected to the CPU 235 by means of a hub which is configured from the memory controller hub 232 and a bus which is configured from the front side bus 237, and so forth.

The flash memory 234 is a non-volatile memory which stores programs and computation parameters and so on which are used by the CPU 235. The flash memory 234 is mutually connected to the CPU 235 by means of a hub which is configured from the I/O controller hub 233 and a bus which is configured from the front side bus 237, and so forth.

The CPU 235 functions as an arithmetic processing device and a controller and controls the overall operation in the microprocessor packages 230 according to various programs. In addition, the CPU 235 is configured from four Microprocessors (MP) 236a, 236b, 236c, 236d (hereinafter referred to as 'microprocessors 236').

Figure 5:
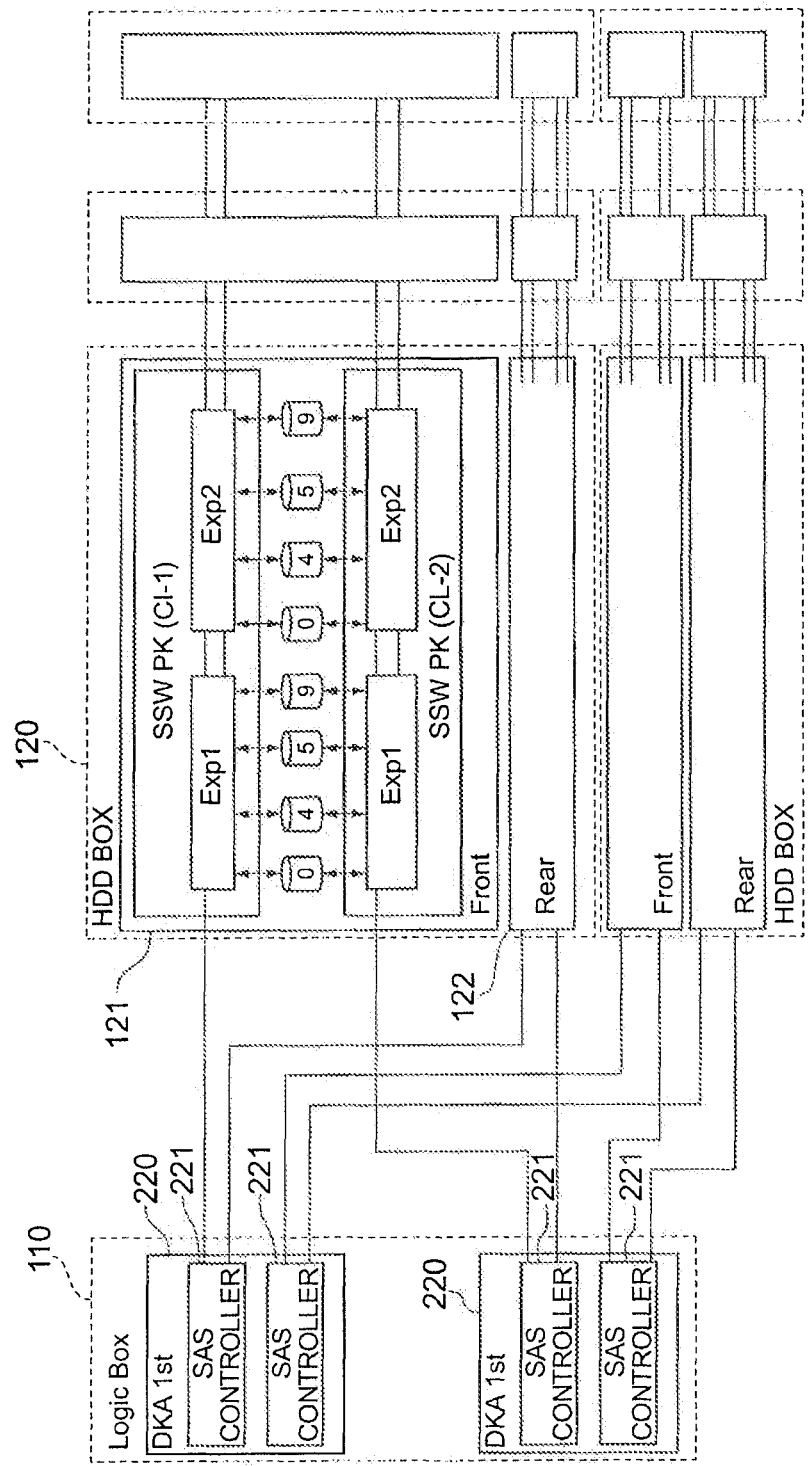
FIG. 5 A block diagram showing backend connections between storage media and disk adapters according to the first embodiment.

FIG. 5 shows backend connections between the disk adapters 220 and storage medium 15. As shown in FIG. 5, the disk adapters 220 of the control module 110 are interconnected with the driver modules 120 via Serial Attached SCSI (SAS) controllers 221.

The disk adapters 220 transmit data read/write commands to the driver modules 120 based on control of the microprocessors 236 in the microprocessor package 230. In addition, the disk adapters 220 transmit the data read/write commands via the plurality of SAS controllers 221. The SAS controllers 221 transmit commands to hard disks which are data read/write targets.

Furthermore, as shown in FIG. 5, the driver module 120 comprises a plurality of hard disks 15 (reference number 15 is not shown in FIG. 5). The plurality of hard disks 15 are arranged in equal numbers at the front (abbreviated as 'Front' in the drawings) and rear (abbreviated as 'Rear') of the enclosure. The hard disks 15 disposed at the front of the enclosure are connected in series by means of a plurality of expanders (abbreviated as 'Exp1' and 'Exp2' in the drawings). The expanders include a function for distributing data read/write commands transmitted from the disk adapters 220 to each of the hard disks. Furthermore, the hard disks 15 disposed at the rear of the enclosure are connected in series by means of a plurality of expanders in the same way as the hard disks 15 disposed at the front of the enclosure.

Figures 6, 7:
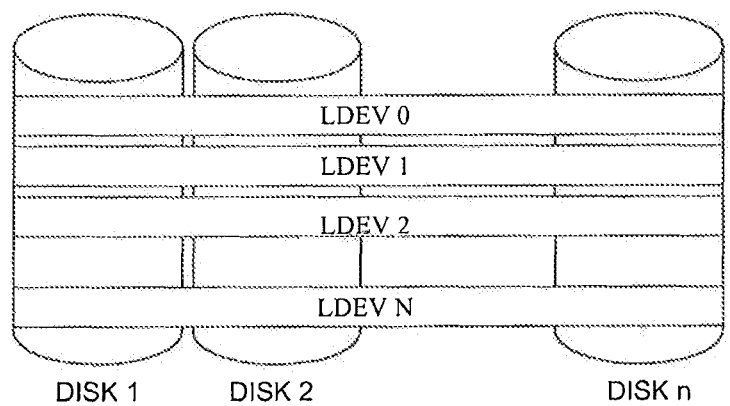
FIG. 6 A conceptual view illustrating logical volumes according to the first embodiment.
FIG. 7 A diagram showing an example of an ownership rights control table according to the first embodiment.

As shown in FIG. 6, one or more logical volumes (abbreviated as 'LDEV' in the drawings) are configured in the storage area provided by the plurality of hard disks 15. In addition, the storage area provided by the hard disks 15 may also be managed as a pool that is supplied to the host 20. The pool may be a pool which is provided by the RAID group or a pool provided by Thin Provisioning, for example. For example, in the case of a pool that is provided by the RAID group, one RAID group is configured from a plurality of disks and one or a plurality of logical volumes are defined in the storage area provided by one RAID group. Furthermore, logical volumes which are provided by a plurality of RAID groups are managed as a single pool.

In addition, in this embodiment, LDEV ownership rights are configured for each microprocessor package 230. The LDEV ownership rights are rights for accessing LDEV control information. If LDEV ownership rights have not been configured for each microprocessor package 230, I/O processing must be executed with respect to the target logical volume after restricting access to the logical volumes of other microprocessor packages. In this case, information indicating which microprocessor package 230 has accessed which logical volume is stored in the aforementioned shared memory.

The microprocessors 236 may therefore need to access the shared memory when executing exclusive extent processing. However, the time for accessing the shared memory will then be from a few times to several hundred times the time required to access the memory in the microprocessor package 230. Moreover, because, when accessing data stored in the shared memory, access is made with the shared memory locked, if the microprocessors 236 of the plurality of microprocessor packages 230 share the shared memory, the processing time for accessing the shared memory is prolonged.

Therefore, in this embodiment, by configuring LDEV ownership rights for each of the microprocessor packages 230, access to the shared memory can be eliminated in the data read/write processing in order to improve access performance. In addition, by configuring the LDEV ownership rights, the control information which is required in exclusive extent processing (described subsequently) can be managed only in an area which is shared by the microprocessors 236 in the microprocessor packages 230.

For example, an ownership rights control table 700 for configuring ownership rights for each of the logical volumes can be stored in the memory of the storage apparatus 10 so that ownership rights can be configured for each of the microprocessor packages 230. As shown in FIG. 7, the ownership rights control table 700 is configured from an LDEV number field 701 and an ownership rights MPPK field number 702. The LDEV number field 701 stores numbers identifying logical volumes. The ownership rights MPPK number field 702 stores the numbers of microprocessor packages which include ownership rights corresponding to logical volume numbers. For example, MPPK0 possesses the ownership rights to LDEV 0 and 'MEV 0' signifies the fact that this logical volume can only be accessed by the MPPK0. Similarly, MPPK1 possesses the ownership rights to the LDEV 1 and 'LDEV 1' signifies the fact that this logical volume can only be accessed by the MPPK1.

Figure 8:
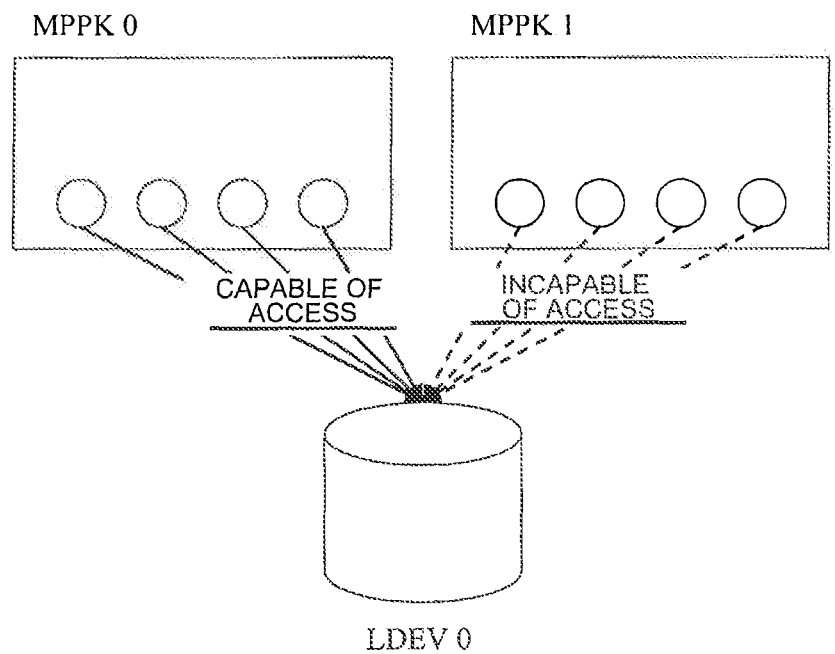
FIG. 8 A conceptual view illustrating ownership rights according to the first embodiment.

As shown in FIG. 8, each of the microprocessor packages 230 is only able to access the logical volumes configured in the ownership rights control table 700 and is unable to access logical volumes for which ownership rights have not been configured. Hence, according to this embodiment, there is no need to perform exclusion processing on different logical volumes because microprocessor packages 230 are configured so as to be capable of accessing each logical volume. However, four microprocessors 236 in a single microprocessor package 230 are capable of accessing the same logical volume simultaneously. It is therefore necessary to execute so-called exclusive extent processing so that there is no conflict of access to the same area by determining whether or not there is an extent overlap within the same logical volume.

Figure 9:
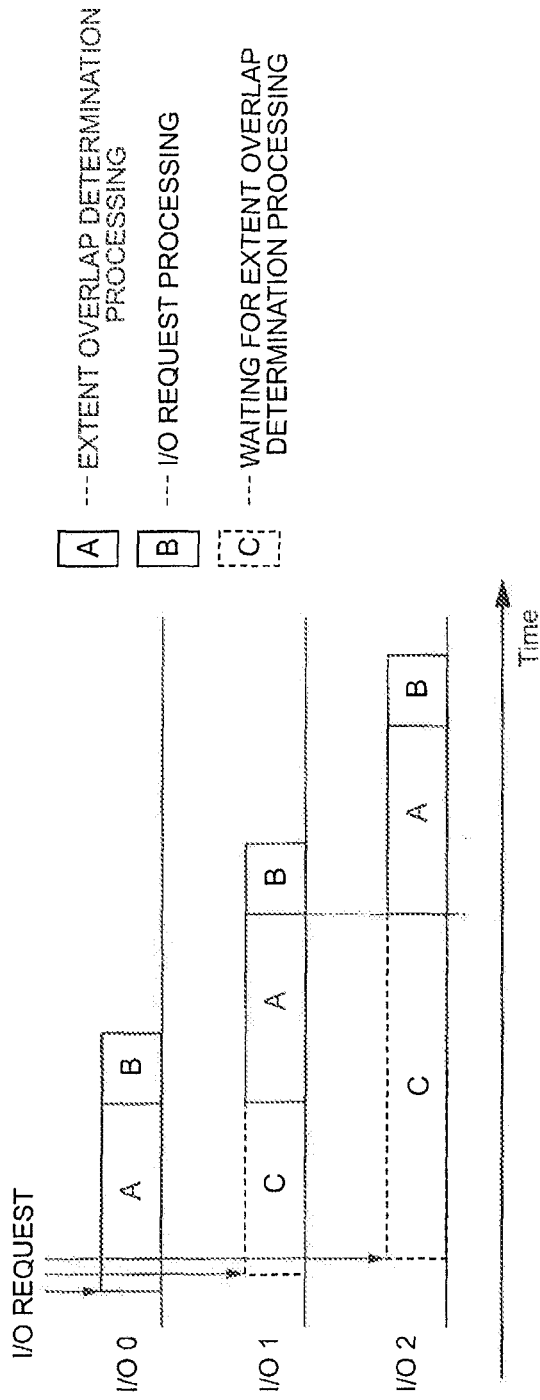
FIG. 9 A conceptual view providing an overview of conventional exclusive extent processing.

Conventional exclusive extent processing and the exclusive extent processing according to this embodiment will be compared and described here. As shown in FIG. 9, conventionally if there are multiple I/O requests with respect to the same volume, a single I/O request possesses the control information of this volume and makes an extent overlap determination. For this reason, while a single I/O request is executing exclusive extent processing, other I/O requests enter a waiting state in which exclusive extent processing cannot be executed. As shown in FIG. 9, due to an increase in the multiplicity of I/O requests with respect to the same volume, there is an increase in the extent overlap determination processing wait (C in the drawings) time and therefore a deterioration in the response time performance, which is problematic.

More specifically, conventionally, in exclusive extent processing it is determined whether or not there is a lock on I/O control information of access-target logical volumes. Subsequently, if there is no lock on the I/O control information of the access-target logical volumes, exclusive extent processing is executed in a state where there is a lock on the I/O control information. In addition, a state is assumed in which the I/O control information in logical volume units is locked while the exclusive extent processing is being executed. Other I/O processing therefore enters a waiting state until the lock is released while the exclusive extent processing is being executed.

Figure 10:
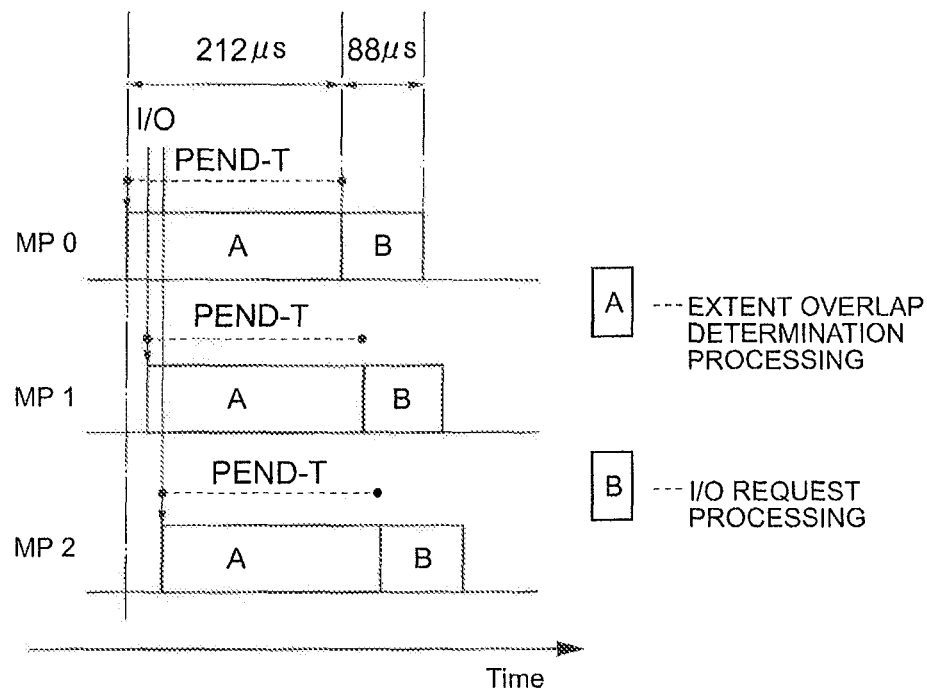
FIG. 10 A conceptual view providing an overview of exclusive extent processing according to the first embodiment of the present invention.

Therefore, in an embodiment, if there are multiple I/O requests with respect to the same volume, a counter value is assigned to each I/O request so that exclusive extent processing of a plurality of I/O requests is executed in parallel. More specifically, I/O control information is only locked when a counter value assigned to logical volume units is acquired for each I/O request. As a result, the exclusive extent processing can be executed in parallel simply by performing exclusion processing so that two or more I/O requests do not acquire counter values simultaneously. To this end, as shown in FIG. 10, the control time is made as short as possible in order to allow the exclusive extent processing (time A in the drawings) to be executed in parallel.

(3) Storage Apparatus Software Configuration

Figure 11:
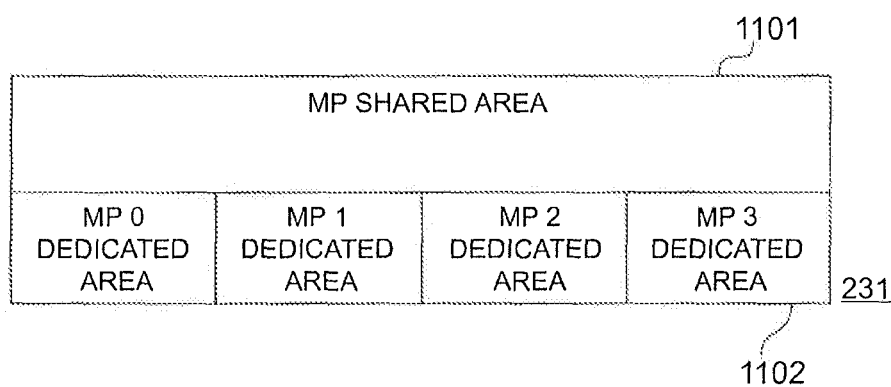
FIG. 11 A conceptual view showing an example of storage areas of the logical memory of the microprocessor package according to the first embodiment.

FIG. 11 shows the details of the logical memory 231 of the microprocessor package 230. The microprocessor package 230 contains one logical memory 231 and is shared by four microprocessors 236. As shown in FIG. 11, the four microprocessors 236 use a storage area of the logical memory 231 by logically partitioning the storage area. In other words, the logical memory 231 is configured from an MP shared area 1101 which is shared and used by the four microprocessors 236, and MP dedicated areas 1102 which are used exclusively by each of the microprocessors 236. The logical memory 231 is logically partitioned and therefore each of the microprocessors 236 is able to access the dedicated areas of the other microprocessors.

Since the logical memory 231 is shared by four microprocessors 236, information in the logical memory 231 may be updated simultaneously by a plurality of the microprocessors 236. Therefore, in order to retain consistency of information in the logical memory 231, access to the logical memory 231 must be restricted if the plurality of microprocessors 236 update this information. Furthermore, the MP shared area 1101 is an area which stores information shared and used by a plurality of microprocessors 236, and which stores counter values indicating the I/O order, for example. Furthermore, the dedicated areas 1102 are areas which store information used when each of the microprocessors 236 accesses the logical volume (LDEV) to which it possesses ownership rights, and which store trace information indicating what kind of processing is performed by the microprocessors 236, for example.

Figure 12:
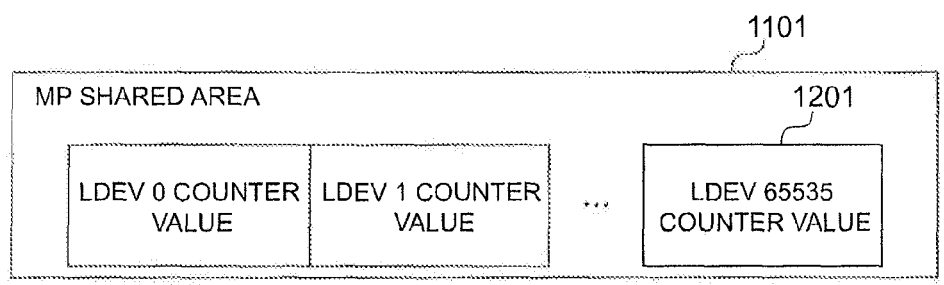
FIG. 12 A conceptual view showing an example of storage points of counter values defined in the microprocessor (MP) shared area according to the first embodiment.

Furthermore, FIG. 12 shows storage points of counter values defined in the MP shared area 1101. As shown in FIG. 12, the MP shared area 1101 stores counter values 1201 which are configured for logical volume (LDEV) units. The counter values 1201 fulfill the role of numbered tickets for accessing logical volumes with ownership rights and represent information which is used in I/O request exclusion control. The I/O requests acquire counter values of access-target logical volumes (LDEV) stored in the MP shared area 1101, and store these counter values in Job Control Blocks (JCB), which will be described subsequently.

Figure 13:
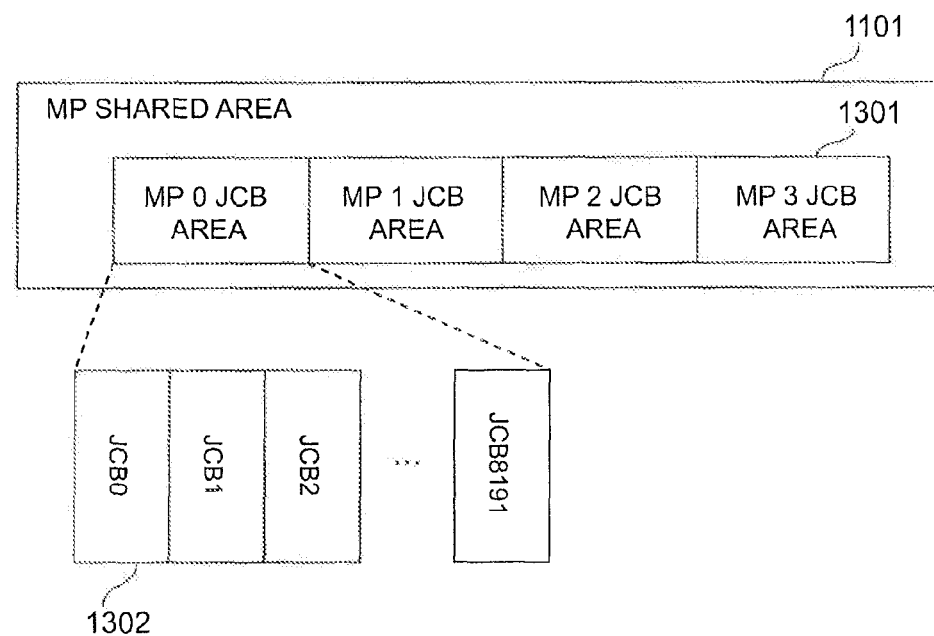
FIG. 13 A conceptual view showing an example of job control blocks defined in the MP shared area according to the first embodiment.

The job control blocks will be described next with reference to FIGS. 13 and 14. The job control blocks are areas (for example, MP3 JCB area 1301) which are used to control I/O processing or other jobs with respect to the logical volumes. A single job control block (for example, JCB0 1302) is assigned to a single job.

A job is configured from a command (CCW chain) which indicates an I/O operation from a host 20 which is connected to a channel adapter 210, and which is a single unit of an I/O request. Examples of CCW chains include, for example, a command 'x63' to define extent ranges, a command 'x47' for searching for target records, and a command 'x06' for reading data, and so on.

Furthermore, the job control blocks store job-related information such as extent ranges, counter values, and I/O attributes such as read processing or write processing. In addition, as shown in FIG. 13, the job control blocks 1302 are defined in microprocessor unit areas 1301 in the MP shared area 1101.

When executing jobs such as I/O processing, the microprocessors 236 each refer to the job control blocks of each job stored in the MP shared area 1101 and control job execution. The microprocessors 236 use the job control blocks which are allocated until job execution ends.

Furthermore, after the job ends, the job control blocks enter a free state in which they can be used by other job control blocks. Furthermore, a job control block which is in a usable state is used to control jobs which are executed subsequently. The job control blocks are used repeatedly by a plurality of jobs.

Furthermore, the job control blocks 1302 are each assigned an individual JCB number and the microprocessors use the JCB numbers to determine the job processing order and so on. The job control blocks can also be defined in fixed-size units (for example, 8092, or 8K, blocks) for each of the microprocessors 236. That is, a 32K-job control block can be defined for a single microprocessor package 230.

FIG. 14 shows details of extent management information 1402 which is stored in the job control blocks 1302. As shown in FIG. 14, examples of the extent management information 1402 include, for example, an extent processing controller, a counter value, a start position address, an end position address, and so on. Each extent management information item is identified by a reference number 1401.

The extent processing controller is information 1403 for managing the status of the I/O processing, i.e. information such as an extent reservation bit, an exclusive extent waiting bit, an extent significant bit, a counter value significant bit, and so forth.

The extent reservation bit is information which is configured (bit ON) when it is determined, as a result of a job executing exclusive extent processing, that I/O processing can be continued. The exclusive extent waiting bit is configured when, as a result of a job executing exclusive extent processing, it is determined that I/O processing cannot be continued, that is, that I/O processing is in a waiting state.

Furthermore, the extent significant bit is configured in cases where the 'start position address' and 'end position address' in the job control blocks are valid values. In other words, when this bit is not configured, the 'start position address' and 'end position address' in the job control blocks are invalid and cannot be trusted.

Furthermore, the counter value significant bits are configured when the microprocessors 236 acquire counter values in the MP shared area 1101. That is, when these bits are not configured, the 'counter values' stored in the job control blocks are invalid and cannot be trusted.

(4) Details of Storage Apparatus Operation

Figure 15:
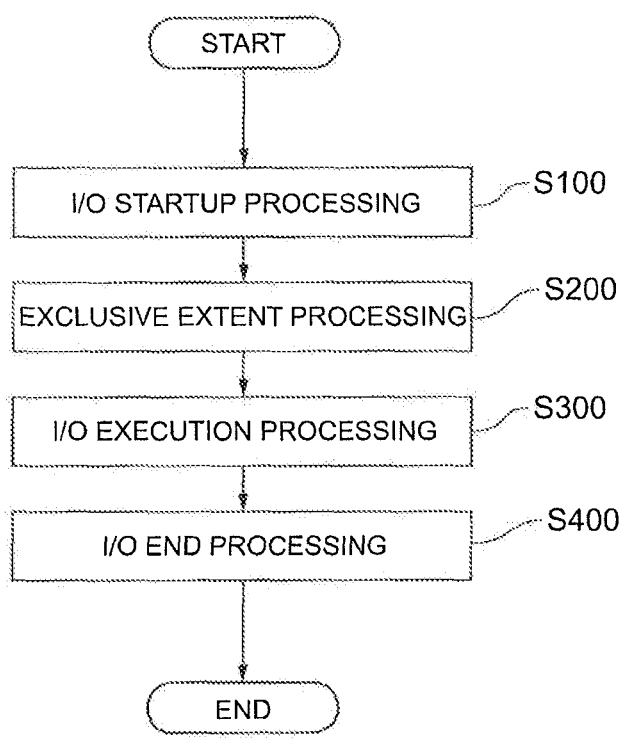
FIG. 15 A flowchart showing all I/O processing in the microprocessor of the storage apparatus according to the first embodiment.

FIG. 15 shows the flow of all the I/O processing in the microprocessor 236 of the storage apparatus 10. As shown in FIG. 15, the microprocessors 236 first execute I/O startup processing (S100). In specific terms, the microprocessors 236 perform polling at regular intervals of the memory in the microprocessor package 230 in order to detect whether or not I/O data has been transmitted from the hosts 20 via the channel adapters 210.

Furthermore, if it is detected in step S100 that data has been transmitted from the hosts 20, the microprocessors 236 execute exclusive extent processing to execute the I/O data (S200). The exclusive extent processing in step S200 will be described in detail subsequently.

The microprocessors 236 then execute I/O processing based on the I/O data transmitted from the hosts 20 after executing exclusive extent processing in step S200 (S300). Specifically, the microprocessors 236 execute reading/writing of the data stored on the hard disks 15.

The microprocessors 236 then execute I/O end processing (S400). More specifically, the microprocessors 236 notify the channel adapters 210 that I/O processing has ended in order to inform the hosts 20 that I/O processing has been executed.

Figure 16:
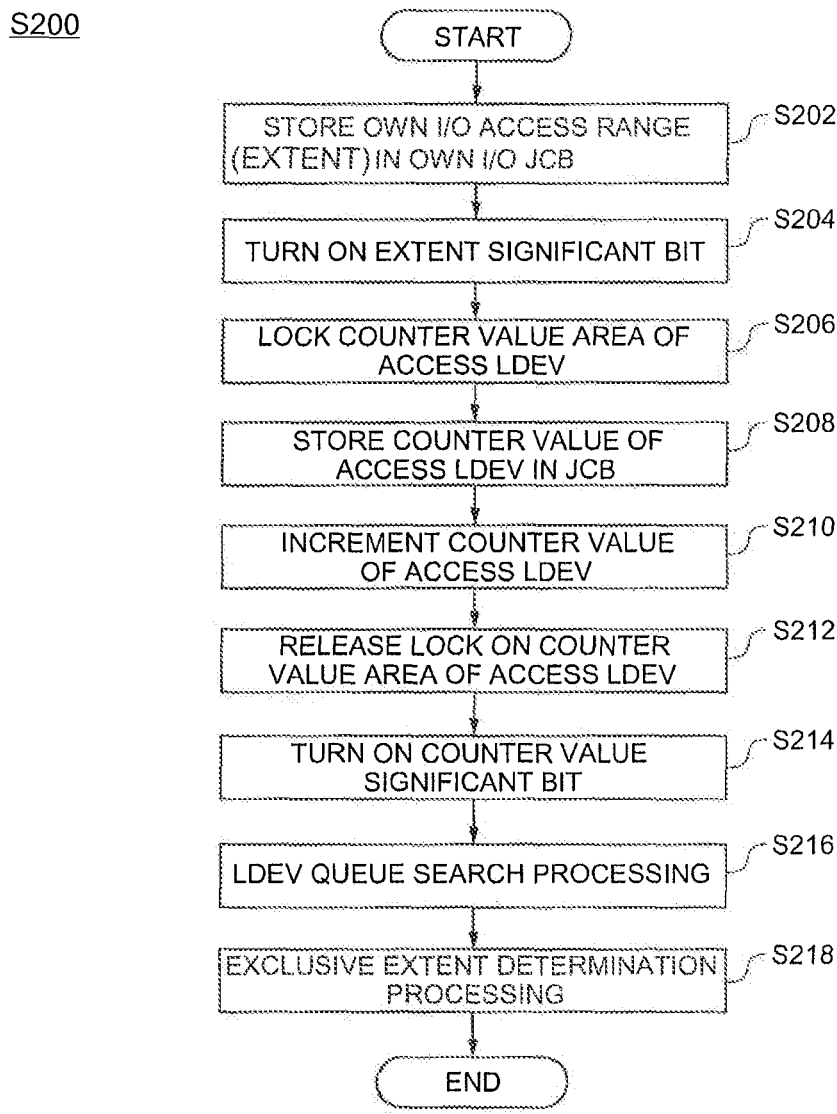
FIG. 16 A flowchart showing exclusive extent processing according to the first embodiment.

FIG. 16 is a flowchart showing details of exclusive extent processing of step 200 in FIG. 15. As shown in FIG. 16, the microprocessors 236 first store the access range (extent) for their own I/O processing in the job control blocks (S202).

The job control blocks are areas assigned to each I/O processing and which store control information for I/O processing when the microprocessors 236 execute the I/O processing. Hence the microprocessors 236 store the access range for their own I/O processing in the job control block which corresponds to their own I/O processing. Furthermore, the access range is indicated by the start position address and end position address of the logical volume which is the access target.

The microprocessors 236 then turn ON the extent significant bit of the extent management information 1402 stored in their own job control blocks after storing their own access range in step S202 in the job control blocks (S204).

As mentioned hereinabove, the extent significant bit is a flag which is configured in cases where the 'start position address' and 'end position address' are valid values in the job control blocks, and is a flag which is configured when the microprocessors 236 store their own access range in the job control blocks. The microprocessors 236 execute exclusive extent processing if the extent significant bit of another I/O job control block is ON, that is, if the other I/O access range is valid.

The microprocessors 236 then lock the counter value area of the access-target logical volume (LDEV) (S206). More specifically, the microprocessors 236 lock the area storing the access-target logical volume counter value, in the MP shared area 1101 of the logical memory 231 in the microprocessor package 230.

The microprocessors 236 subsequently acquire the counter values of the access-target logical volumes in the MP shared area 1101 of the logical memory 231 in the microprocessor package 230, and store these counter values in the job control blocks corresponding to their own I/O processing (S208). The microprocessors 236 then add one to (increment by one) the counter values of the access-target logical volumes in the MP shared area 1101 of the logical memory 231 in the microprocessor package 230 (S210).

The microprocessors 236 then release the lock on the counter value area of the access-target logical volumes in the MP shared area 1101 of the logical memory 231 in the access microprocessor package 230 (S212).

The microprocessors 236 then turn ON the counter value significant bit of the extent management information 1402 stored in their own job control blocks (S214). Like the extent significant bits, the counter value significant bits are flags to which the microprocessors 236 refer when executing exclusive extent processing. The microprocessors 236 execute exclusive extent processing if the counter value significant bit of another I/O is ON, that is, if the counter value is valid.

The microprocessors 236 then execute LDEV queue search processing (S216). The LDEV queue is an I/O wait queue in the microprocessor package 230, i.e. an LDEV unit queue. The LDEV queue is a wait queue which links job control blocks of I/Os which access or are accessing the LDEV. The act of introducing data to a queue is known as 'enqueue' and the act of taking data from a queue is known as 'dequeue'. Processing to search for LDEV queues in step S216 will be described in detail subsequently.

The microprocessors 236 then execute exclusive extent determination processing (S218). More specifically, exclusive extent determination processing is processing with which the microprocessors 236 compare the extent range of job control blocks of the LDEV queue retrieved in step S216 with the extent range of their own I/O job control blocks.

Figure 17:
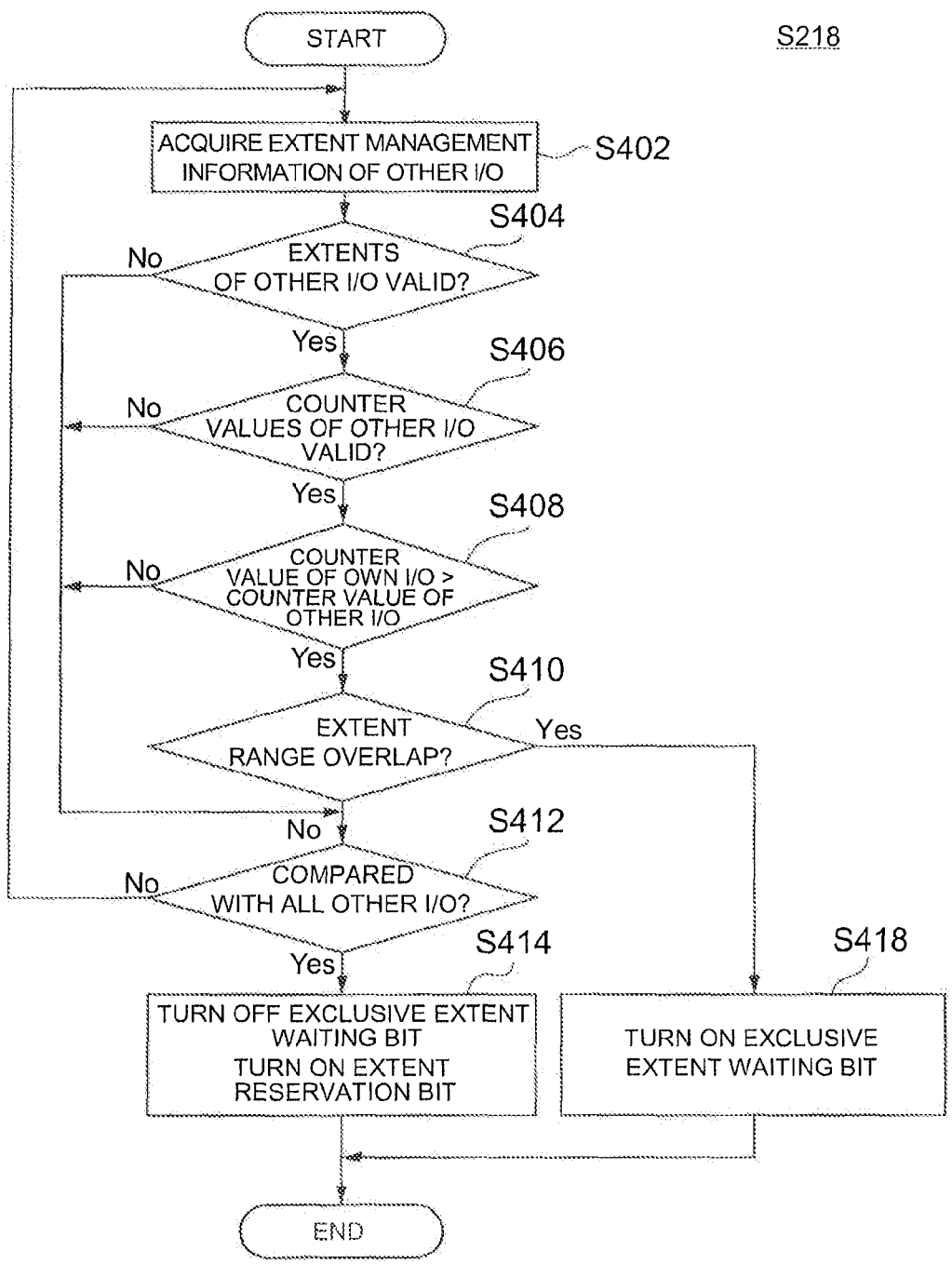
FIG. 17 A flowchart showing details of exclusive extent processing according to the first embodiment.

Details of the exclusive extent processing in step S218 will now be described in detail. FIG. 17 shows details of exclusive extent processing. As shown in FIG. 17, the microprocessors 230 acquire extent management information for other I/O (S402). More specifically, the microprocessors 230 refer to a search list created by the aforementioned LDEV queue search processing and acquire the extent management information 1402 of the job control blocks which are targets of the exclusive extent processing. The extent management information 1402 is information, for managing extent processing, which includes the counter values shown in FIG. 14.

The microprocessors 230 then refer to the extent significant bits of the extent management information 1402 of job control blocks of other I/O to determine whether the extents of the other I/O are valid (S404). In specific terms, the microprocessors 230 determine that an extent is valid if the extent significant bit is ON. If it determined in step S404 that the extent of the other I/O is invalid, the microprocessors 230 execute the processing of step S412 and beyond.

If it is determined in step S404 that the extent of the other I/O is valid, the microprocessors 236 then refer to the counter value significant bits of the extent management information 1402 of job control blocks of the other I/O to determine whether the counter value of the other I/O is valid (S406). In specific terms, the microprocessors 236 determine that a counter value is valid if the counter value significant bit is ON. If it is determined in step S406 that the counter value of the other I/O is invalid, the microprocessors 236 execute the processing of step S412 and beyond.

If it is determined in step S406 that the counter value of the other I/O is valid, the microprocessors 236 then compare their own I/O counter value with the counter value of the other I/O, and determine whether the counter value of its own I/O is greater than the counter value of the other I/O (S408). If the counter value of its own I/O is greater than the counter value of the other I/O, its own I/O follows the other I/O, and it is therefore necessary to determine whether there are overlapping extent ranges. If, on the other hand, the counter value of its own I/O is smaller than the counter value of the other I/O, the other I/O follows its own I/O. In this case, because its own I/O is processed in advance of the other I/O, it is not necessary to determine whether there are overlapping extent ranges.

If it is determined in step S408 that the counter value of its own I/O is smaller than the counter value of the other I/O, the microprocessors 236 execute the processing of step S412 and beyond. If, on the other hand, it is determined in step S408 that the counter value of its own I/O is greater than the counter value of the other I/O, the microprocessors 236 determine whether there is an overlap between the extent range of its own I/O and the extent range of the other I/O (S410). In specific terms, the microprocessors 236 compare ranges indicated by the start position address and the end position address of the extent management information of the job control blocks of their own I/O and other I/O in order to determine whether there is a degree of overlap between these ranges.

If it is determined in step S410 that there is no overlap between the extent range of its own I/O and the extent range of the other I/O, the microprocessors 236 determine whether its own I/O has been compared with all the other I/Os (S412). In specific terms, the microprocessors 236 determine whether the management information of the job control blocks of their own I/O has been compared with the management information of the job control blocks of all the other I/Os listed in the search list shown in FIG. 19.

If it is then determined in step S412 that their own I/O has been compared with all the other I/Os, the microprocessors 236 then turn OFF the exclusive extent waiting bit of the extent management information of their own job control blocks and turn ON the extent reservation bit (S414).

If it is determined in step S410 that there is an overlap between the extent range of its own I/O and the extent range of the other I/O, the microprocessors 236 turn ON the exclusive extent waiting bit (S418). More specifically, the microprocessors 236 then turn ON the exclusive extent waiting bit of the extent management information of the job control blocks shown in FIG. 14. If the exclusive extent waiting bit is ON, the microprocessors 236 are unable to execute their own I/O processing and wait to execute their own I/O processing until the I/O processing of the other I/O with which an extent range overlap exists has finished.

The exclusive extent waiting bit and extent reservation bit of the extent management information have an opposing relationship. If the exclusive extent waiting bit is ON, this indicates that the microprocessors 236 are unable to continue their own I/O processing and are waiting for the end of the other I/O processing with which there is an extent range overlap. Furthermore, a case where the extent reservation bit is ON is configured in cases where the microprocessors 236 determine that their own I/O processing can be continued. Details of exclusive extent processing were described hereinabove.

Figure 18:
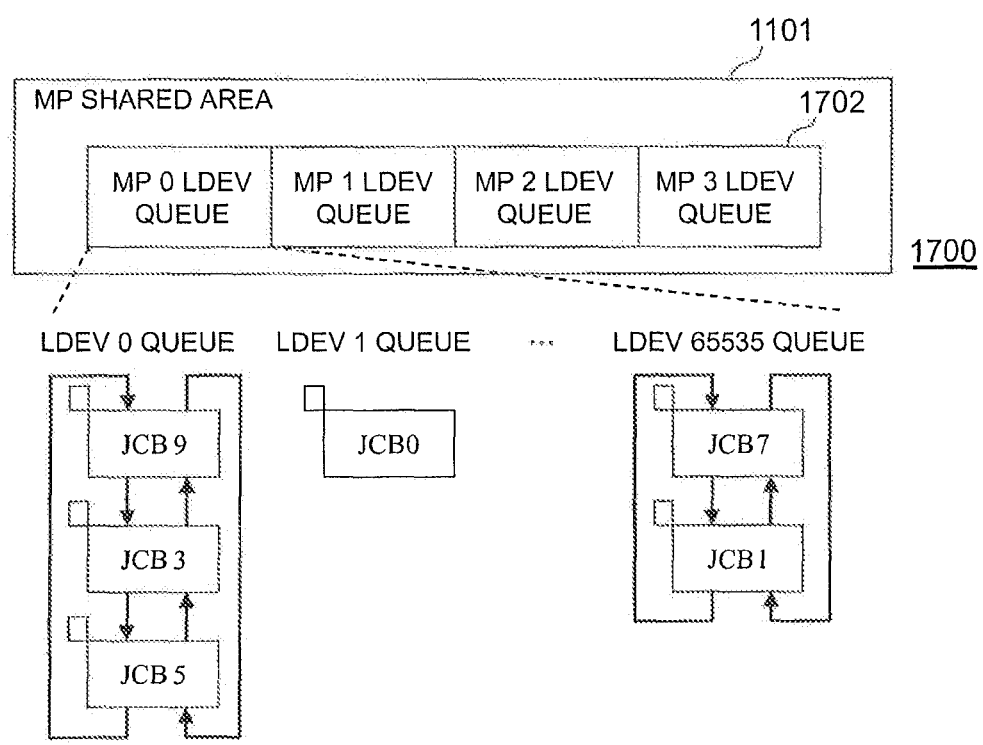
FIG. 18 A conceptual view of an example of a logical volume (LDEV) queue according to the first embodiment.

Subsequently, details of LDEV queue search processing will be provided next. As shown in FIG. 18, the LDEV queues are stored in the MP shared area 1101 which is shared and used by four microprocessors 236. The LDEV queue area 1702, which stores each of the microprocessor LDEV queues, stores the queues of the LDEV for which the microprocessor packages 230 have ownership rights.

For example, if the job control blocks which access or are accessing LDEV 0 are JCB (9), JCB (3), and JCB (5), information is stored indicating that the queues of the MP 0 LDEV 0 are waiting queues linking the three job control blocks JCB (9), JCB (3), and JCB (5). When searching for the LDEV queues, a search is performed for all the job control blocks of the target LDEVs which are stored in the memory of four microprocessors, namely MP 0, MP 1, MP 2, and MP 3.

Figure 19:
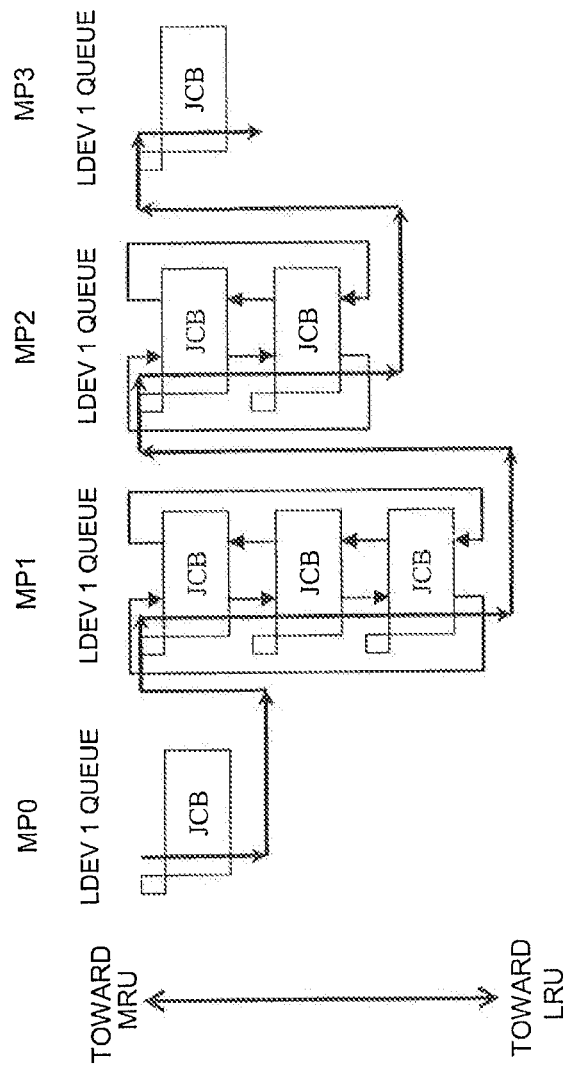
FIG. 19 A conceptual view of an LDEV queue search system according to the first embodiment.

FIG. 19 is a conceptual view to illustrate an LDEV queue search system. As mentioned earlier, LDEV queues are stored for each LDEV in the memory of each of the microprocessors 236. The microprocessors 236 search for the LDEV queues of the processing target LDEV of their own I/O.

In specific terms, the microprocessors 236 search for their own LDEV queues and the LDEV queues of the other microprocessors in the same microprocessor package 230. For example, as shown in FIG. 19, when searching for the LDEV queue of LDEV 1, the microprocessors 236 search for the job control blocks of each of the LDEV queues in order working from the MRU (Most Recently Used) toward the LRU (Least Recently Used).

When I/O processing is initiated, the job control blocks of new I/O processing are enqueued starting with the MRU of the LDEV queues. Normally, when executing a search in order working from the LRU toward the MRU, leakage in the search during queue operation will likely occur. For example, when searching for the LDEV queues, the job control blocks in the search are dequeued and job control blocks of the same JCB number as the job control blocks dequeued by subsequent I/O processing are enqueued starting with the MRU. In this case, LDEV queue search leakage arises between the job control blocks being searched and the job control blocks which are dequeued starting with the MRU.

Suppose, for example, that in a certain LDEV queue, the queues are linked starting with the LRU in the order JCB (3), JCB (1), and then JCB (9), and that JCB (1) is dequeued when the microprocessors 236 are searching for the JCB (1). When JCB (1) is being used by other I/O processing, the JCB (1) is then enqueued starting with the MRU.

Here, the queues are linked starting with the LRU in the order JCB (3), JCB (9), and then JCB (1). At that point, the microprocessors 236 searching for the queues starting with the LRU end the search based on the fact that there is no linked queue following the MRU JCB (1) and the JCB (9) is leaked from the search target.

Therefore, in this embodiment, search leakage is prevented by making the search direction extend not from the LRU to the MRU but instead from the MRU to the LRU. However, in cases where the LDEV queue search processing is executed starting with the MRU, if queue operations such as dequeuing or enqueuing are generated in the job control blocks being searched for and if a queue returns to the MRU, the search must be executed once again starting with the MRU.

When the processing time for the search processing of a single job control block is extended by the microprocessors 236, the queue operation of the job control blocks will probably occur frequently and the search processing will take time. Therefore, before LDEV queue search processing is executed, a search list for a search starting with the MRU and ending with the LRU is created and search processing is executed by referring to the search list. As a result, the processing time for the search processing can be shortened while preventing search leakage.

Furthermore, when a search list indicating the search order of job control blocks is created, the JCB numbers of the job control blocks linked to the LDEV queue of each of the microprocessors 236 and the JCB generation numbers are acquired. The job control blocks are used as areas for storing control information of I/O processing by the plurality of I/O processes. The microprocessors 236 identify which job control blocks are used by which I/O processing from the JCB numbers and generation numbers of the job control blocks.

FIG. 20 shows an example of a search list which is created before search processing is executed. The search list 1900 is a list to which the microprocessors 236 refer when executing LDEV queue search processing and which is configured from an MP number (MP No) field 1901, a JCB number (JCB No) field 1902, and a generation number (generation No) field 1903.

The MP number field 1901 stores numbers identifying microprocessors 236 in those microprocessor packages 230 to which the microprocessors 236 being searched belong. The JCB number field 1902 stores JCB numbers of the job control blocks linked to the LDEV queue. The generation number field 1903 stores the generation numbers of each of the job control blocks.

The microprocessors 236 acquire the JCB numbers stored in the search list and execute exclusive extent processing in the order of the search list. Although I/O processing will likely also be initiated from the point where the microprocessors 236 create the search list, it is not clear that the I/O processing follows its own I/O processing and hence need not be made a search target.

Figure 21:
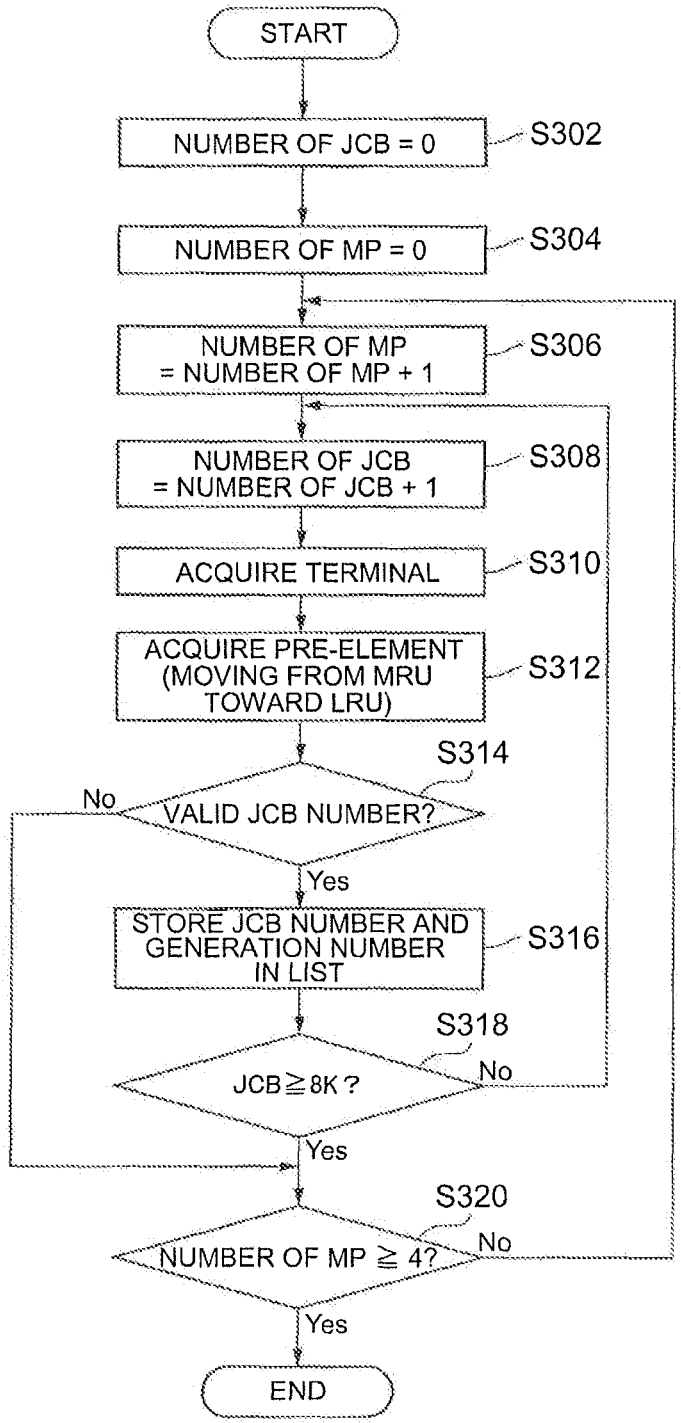
FIG. 21 A flowchart showing search list creation processing according to the first embodiment.

FIG. 21 shows the flow of search list creation processing before the microprocessors 236 execute search processing. The search list creation processing targets the LDEV queues of four microprocessors 236 in the microprocessor package 230. The microprocessors 236 create a search list by taking, as search targets, not only the job control blocks of their own microprocessors 236 but also the job control blocks of the other microprocessors.

In reality, the microprocessors 236 replace the variable 'number of JCBs' with '0' (S302), and the variable 'number of MPs' with '0' (S304). The microprocessors 236 then add '1' to the variable 'number of MPs' (S306), and add '1' to the variable 'number of JCBs' (S308).

In the subsequent determination processing, by determining whether or not the variable 'number of MPs' is equal to or more than the number '4' in the microprocessor package 230 and determining whether or not the variable 'number of JCBs' is equal to or more than '8K', a search list can be created by taking, as search targets, all the job control blocks in the microprocessor package 230.

The microprocessors 236 then acquire a terminal (S310). In specific terms, the microprocessors 236 acquire a specific job control block which is stored in the microprocessor package 230 as a terminal. 'Terminal' signifies a search processing start value.

The microprocessors 236 then acquire an element (a "pre-element") which precedes the terminal acquired in step S310 (S312). More specifically, the microprocessors 236 acquire job control blocks closer to the LRU than the job control blocks acquired in step S310.

The microprocessors 236 then determine whether the JCB number of the job control blocks acquired in step S312 is a valid JCB number (S314). Numbers in a quantity ranging from 0 to a prescribed number are assigned to the JCB numbers. The microprocessors 236 therefore determine whether the JCB number is a valid JCB number depending on whether the JCB number exceeds the prescribed number. In other words, if the JCB number is no more than the prescribed number, the JCB number is validated, and if the JCB number is larger than the prescribed number, the JCB number is invalidated.

If it is determined in step S314 that the JCB number is valid, the microprocessors 236 then store the JCB numbers and generation numbers of the job control blocks acquired in the search list (S316). In specific terms, the microprocessors 236 add the MP numbers of the microprocessors 236 pertaining to the job control blocks searched for in the search list shown in FIG. 19, as well as the JCB numbers and the generation numbers.

The microprocessors 236 then determine whether the variable 'the number of JCBs' is equal to or more than 8K (S318). In step S318, if the variable 'the number of JCBs' is smaller than 8K, the processing of step S308 is repeated. In step S318, if the variable 'the number of JCBs' is equal to or more than 8K, the microprocessors 236 determine whether the variable 'number of MPs' is equal to or more than four (S320). In step S320, if the variable 'the number of MPs' is smaller than four, the processing of step S306 is repeated. In step S320, if the variable 'the number of MPs' is equal to or more than four, the processing is ended.

If it is determined in step S314 that a JCB number is invalid, the microprocessors 236 execute the processing of step S320.

(5) Effect of the Embodiment

As described hereinabove, with the storage apparatus 10 according to this embodiment, if there is an I/O request from a host 20, the microprocessors 236 store the access range of the I/O request in the job control blocks, turn ON the extent significant bit of the job control blocks, lock the counter value areas of the logical volumes which are access targets of the I/O requests of the MP shared area 1101, acquire the counter values stored in the counter value areas, store the counter values in the job control blocks, add '1' to (increment by one) the counter values of the MP shared area 1101, and then release the lock on the counter value areas.

Furthermore, when executing their own I/O requests, the microprocessors 236 search for the I/O queues (LDEV queues) of the access-target logical volumes, compare the counter values of the searched for I/O requests with the counter values of their own I/O requests, and if the counter values of their own I/O requests are greater than the counter values of the searched for I/O requests, determine whether or not there is an extent range overlap, executing I/O processing if there is no extent range overlap and waiting to execute I/O processing if there is an extent range overlap.

Thus, according to this embodiment, when executing I/O processing, the microprocessors 236 are able to provide a counter value to each of the logical volumes which are targets for the I/O processing and determine the access sequence for access to the logical volumes on the basis of these counter values.

Conventional access of the other I/O processing to the logical volumes must be restricted while a determination is made as to whether or not there is an extent range overlap. By providing counter values, the counter values may be acquired and access by other I/O processing may be restricted only while the counter values are being incremented. It is therefore possible to execute, in parallel, exclusive extent processing of a plurality of I/O requests with respect to the same logical volume, thereby improving the response time performance.

(6) Other Embodiments

Note that although a case was described in the above embodiment in which the microprocessors 236 implement exclusive extent processing and I/O processing and so forth on the basis of various programs stored in memory such as the logical memory 231 and flash memory 234 in the microprocessor packages 230, the present invention is not limited to such a case. For example, various functions may be implemented by storing various programs in storage devices outside the microprocessor package 230 and then calling up these programs.

Moreover, in the above embodiment, a case was described in which four microprocessors 236 are provided in the microprocessor packages 230. The present invention is not limited to this case. For example, more than four microprocessors 236 may be provided in the microprocessor packages 230 and the exclusive extent processing according to this embodiment may be executed in each of the microprocessors 236.

Moreover, in the above embodiment, a case was described where the ownership rights of the microprocessor packages 230 are configured for each of the logical volumes. The present invention is not limited to such a case; for example, if a virtual volume is provided to the hosts 20 by means of a Thin Provisioning function, ownership rights to the microprocessor packages 230 may also be configured for each virtual volume.

INDUSTRIAL APPLICABILITY

The present invention can be applied to a storage apparatus with which the response time performance can be improved by executing, in parallel, exclusive extent processing of a plurality of I/O requests.

REFERENCE SIGNS LIST

1 Computer system
10 Storage apparatus
15 Storage medium
20 Host
30 Management server
40, 50 Network
100, 101 Module
110 Control module
120 Driver module
210 Channel adapter
220 Disk adapter
230 Microprocessor package
231 Logical memory
232 Memory controller hub
233 I/O controller hub
234 Flash memory
235 CPU
236 Microprocessor package
237 Front side bus
240 Cache package

The invention claimed is:

1. A storage apparatus which is connected via a network to a host apparatus that issues data input/output (I/O) requests, comprising:
   a microprocessor package configured to access a logical volume to which the microprocessor package has ownership rights, wherein:
      the microprocessor package includes a plurality of microprocessors and any of the plurality of microprocessors can access the logical volume; and
      the logical volume includes one or more storage areas provided by a plurality of storage devices;
   a local memory in the microprocessor package, the local memory configured to:
      store a counter value indicating a number of I/O requests to and from a logical volume; and
      lock the local memory when a counter value is to be incremented;
   wherein each microprocessor in the microprocessor package is configured to:
      store, if there is one I/O request from the host apparatus, an I/O request range of the one I/O request in the local memory, wherein the I/O request range includes a start position address and an end position address of the logical volume which is a target of the I/O request;
      acquire the counter value of the logical volume which is the target of the one I/O request;
      store the acquired counter value in the local memory;
      if the counter value of the logical volume associated with the one I/O request is greater than the counter value of the logical volume associated with another I/O request, compare the I/O request range of the one I/O request stored in the local memory and the I/O request range of the other I/O request;

if, as a result of comparing the I/O request range of the one I/O request stored in the local memory and the I/O request range of the other I/O request, there is no overlap between the I/O request ranges, execute the one I/O request processing; and if there is an overlap between the I/O request ranges, place the processing of the one I/O request on standby.

2. The storage apparatus according to claim 1, wherein after storing the acquired counter value in the local memory, each microprocessor is further configured to add '1' to the acquired counter value and store the sum in the local memory.

3. The storage apparatus according to claim 1, wherein the local memory is further configured to store control information of I/O requests, wherein the control information includes the counter value, the I/O request range, information indicating whether the counter value and the I/O request range are valid values, and information indicating whether I/O processing can be executed.

4. The storage apparatus according to claim 3, wherein each microprocessor is further configured to compare the I/O request range of the one I/O request and the I/O request range of the other I/O request if the counter value and the I/O request range included in the control information of the other I/O request are valid.

5. The storage apparatus according to claim 3, wherein if the one I/O request processing is executed, each microprocessor is further configured to store information indicating that I/O processing can be executed in the control information of the one I/O request, and if the processing of the one I/O request is placed on standby, each microprocessor is further configured to store information indicating that the execution of the I/O processing has been placed on standby in the control information of the one I/O request.

6. The storage apparatus according to claim 1, wherein, if an I/O queue of the I/O request linked to each of the storage areas is searched starting with a most recently used (MRU) storage area and moving toward a least recently used (LRU) storage area and the counter value of a specific I/O request is greater than the counter value of an I/O request corresponding to a searched for I/O queue, each microprocessor is further configured to compare the I/O request range of the specific I/O request stored in the local memory and an I/O request range of the searched for I/O request.

7. The storage apparatus according to claim 6, wherein each microprocessor is further configured to create a search list which indicates a search order for searching for I/O queues in the storage areas which are the access targets of the one I/O request before searching, from the MRU toward the LRU, for the I/O queues of each of the storage areas and comparing the I/O request range of the one I/O request.

8. The storage apparatus according to claim 7, wherein each microprocessor is further configured to add identification information, which identifies a plurality of I/O queues of each of the storage areas, to the search list.

9. A data access method which employs a storage apparatus connected via a network to a host apparatus that issues data input/output (I/O) requests, the storage apparatus including:

a microprocessor package configured to access a logical volume to which the microprocessor package has ownership rights, wherein the microprocessor package includes a plurality of microprocessors and any of the plurality of microprocessors can access the logical volume, and the logical volume includes one or more storage areas provided by a plurality of storage devices; and a local memory in the microprocessor package, the local memory configured to store a counter value indicating a number of I/O requests to and from a logical volume, and lock the local memory when a counter value is to be incremented;

the data access method comprising:

storing, if there is one I/O request from the host apparatus, an I/O request range of the one I/O request in the local memory by one of the microprocessors, wherein the I/O request range includes a start position address and an end position address of the logical volume which is a target of the I/O request;

acquiring the counter value of the logical volume which is the target of the one I/O request;

storing the acquired counter value in the local memory by the one microprocessor;

if the counter value of the logical volume associated with the one I/O request is greater than the counter value of the logical volume associated with another I/O request, the one microprocessor comparing the I/O request range of the one I/O request stored in the local memory and the I/O request range of the other I/O request;

if, as a result of comparing the I/O request range of the one I/O request stored in the local memory and the I/O request range of the other I/O request, there is no overlap between the I/O request ranges, the one microprocessor executing the one I/O request processing; and if there is an overlap between the I/O request ranges, the one microprocessor placing the processing of the one I/O request on standby.

\* \* \* \* \*